United States Patent [19]

Kaufman et al.

[11] Patent Number: 5,033,444

[45] Date of Patent: Jul. 23, 1991

[54] LIQUID BUTANE FUEL INJECTION FOR INTERNAL COMBUSTION ENGINES

[76] Inventors: Ray L. Kaufman, 1250 Hwy. 101, Watsonville, Calif. 95076; Vernon E. Brunges, 5537 N. 10th #105, Fresno, Calif. 93710; Harold I. Bisel, 619 W. Mitchell Ave., Clovis, Calif. 93612

[21] Appl. No.: 577,752

[22] Filed: Sep. 4, 1990

[51] Int. Cl.⁵ .............................................. F02B 43/00
[52] U.S. Cl. ..................................... 123/527; 123/1 A
[58] Field of Search ............................... 123/527, 1 A

[56] References Cited

U.S. PATENT DOCUMENTS

| | | | |
|---|---|---|---|
| 4,492,208 | 1/1985 | Lent | 123/527 |
| 4,522,159 | 11/1985 | Engel et al. | 123/527 |
| 4,523,548 | 6/1985 | Engel et al. | 123/527 |
| 4,528,966 | 7/1985 | Lent et al. | 123/527 |
| 4,606,319 | 8/1986 | Silva | 123/527 |
| 4,688,537 | 8/1987 | Calkins et al. | 123/527 |
| 4,774,909 | 10/1988 | Dolderer | 123/527 |

*Primary Examiner*—E. Rollins Cross

[57] ABSTRACT

An engine powered by fuel having a boiling temperature less than ambient wherein the fuel is stored as a liquid and delivered in the liquid state to a fuel injection system. The fuel is sprayed into the intake port region of a cylinder head as liquid droplets which then vaporize. The fuel supplied to the injection system is maintained in the liquid state by a cooling system which maintains the liquid fuel below the boiling temperature. One cooling system includes a tube coiled around the injection system through which a refrigerant is circulated and cooled by a refrigeration system. A bleedoff conduit withdraws any excess fuel from the injection region and returns it to the fuel storage tank.

11 Claims, 4 Drawing Sheets

LIQUID BUTANE FUEL INJECTION FOR INTERNAL COMBUSTION ENGINES

FIELD OF THE INVENTION

This invention relates to internal combustion engines and especially to an engine in which LPG fuels are injected in the liquid state into the intake ports of the engine.

BACKGROUND AND INFORMATION DISCLOSURE STATEMENT

Hydrocarbon fuels that must be pressurized when at atmospheric temperature in order to retain them in the liquid state are referred to as "liquefied petroleum gases". (LPG. Two well known examples of such fuels are Butane and Propane. Propane has been used for many years in internal combustion engines and was particularly popular during the late 1960's and early 1970's when the increasing price of gasoline and more stringent requirements on control of fuel emissions increased interest in alternatives to gasoline. LPG fuels continue to be less expensive and are cleaner burning fuels than gasoline. Propane has been the fuel of choice over butane for reasons that will follow.

The standard engine using gasoline simply utilizes a pump to transfer liquid gasoline from a nonpressurized storage tank to a carburetion system.

The state-of-the-art LPG powered engine utilizes a fuel which is stored as a liquid and converted to a vapor before its induction into the engine. The stored fuel is maintained as a liquid in the storage area by virtue of a sufficiently high vapor pressure in the closed storage area which is a function of the ambient temperature. It is this pressurization of the storage tank which provides for fuel delivery to a vaporizer unit which consists of a pressure regulator and a heater. The vaporizer releases the fuel as a vapor which is then drawn by engine vacuum into a device for mixing vaporized fuel and air similar to a standard gasoline carburetor.

Because the fuel enters the engine as heated vapor, a certain amount of air is displaced which lowers density of the intake air/fuel mixture and results in a loss of power. In addition, both LPG hydrocarbons contain less heat energy (BTU/gal) than gasoline. Propane has a much lower boiling point ($-40°$ F.) and much higher vapor pressure than butane whose boiling point is $31°$ F. In low temperature environments, pure Butane does not provide sufficient vapor pressure to deliver fuel to the engine using the pressurized fuel delivery system of the prior art.

THE INVENTION

OBJECTS

It is an object of this invention to provide an engine that operates with fuels which have a higher vapor pressure than gasoline.

It is a further object that the list of operable fuels include LPG fuels which are characterized as being cleaner burning and cost less than gasoline.

Another object is that the engine operate with pure butane in order to take advantage of the heat energy content of butane which is larger than other LPG fuels.

Another object is to provide an engine operating with butane that is characterized by significantly greater power than is provided by engines of the prior art that operate with LPG fuels.

These and other objects will be apparent to a reader after studying the drawings and descriptions of the invention.

SUMMARY

This invention is directed toward an engine comprising at least one cylinder head, each cylinder head including an intake port region communicating through an intake valve with a combustion chamber and structured to operate with an LPG fuel, particularly Butane. The fuel flows as a liquid from a storage tank to a fuel injection rail where it is injected into the intake port regions as a liquid spray. Various embodiments of the invention maintain the fuel in the liquid state in contrast to prior art engines using LPG fuels which rely on vapor pressure of the fuel in the storage tank to force the fuel as a liquid to a vaporizer from which the vaporized fuel is drawn into the combustion chambers by vacuum.

According to this invention, liquid Butane is stored in a pressurized fuel tank. The liquid fuel is delivered to the injection system by a high pressure fuel pump. Before injection into the intake port region, the Butane is maintained as a liquid by a combination of fuel pressure and external cooling of the fuel delivery lines. The fuel is metered and introduced into the intake air stream of the cylinder head by times opening of electronically controlled solenoid injectors.

Several embodiments may be used to cool the fuel and maintain it in the liquid state.

One method is to use a water circulating system.

Another method incorporates a refrigeration system.

In another embodiment a portion of the fuel is allowed to evaporate and thereby act as a refrigerant to cool and maintain the fuel in the liquid state as it enters the injection system. Any excess portion of vaporized fuel is returned to the storage tank via a separate return line.

Injection as a sprayed liquid into the intake port region overcomes the problem of the inherent lack of vapor pressure of Butane which has rendered the use of Butane impractical as a motor fuel in engines of the prior art. Upon its injection into the intake port region, the sprayed liquid butane vaporizes within a negligibly short period. As the Butane undergoes this phase change, an appreciable amount of heat energy (latent heat of vaporization) is removed from the incoming air. The cooling effect thereby provides for a greater density of air/fuel mixture for a given chamber pressure. Increasing the density of air/fuel mixture overcomes much of the power loss commonly associated with LPG vapor fuel systems of the prior art. The cooling effect also increases the life of the engine because of the resultant reduction in overall operating temperature and heat related wear.

Another feature of this invention is that the engine can be configured for dual fuel operation as the fuel system components are compatible, for e.g., with gasoline and liquid Butane. This can be accomplished by a variable control on the cooling system to accommodate the engine for fuels having different vapor pressure vs. temperature characteristics.

DRAWINGS

DETAILED DESCRIPTION OF THE BEST MODE

The following detailed description illustrates the invention by way of example and not by way of limitation of the principles of the invention. This description will clearly enable one skilled in the art to make and use the invention and describes several embodiments, adaptations, variations, alternatives and uses of the invention including what we presently believe is the best mode of carrying out the invention.

Figure 1:
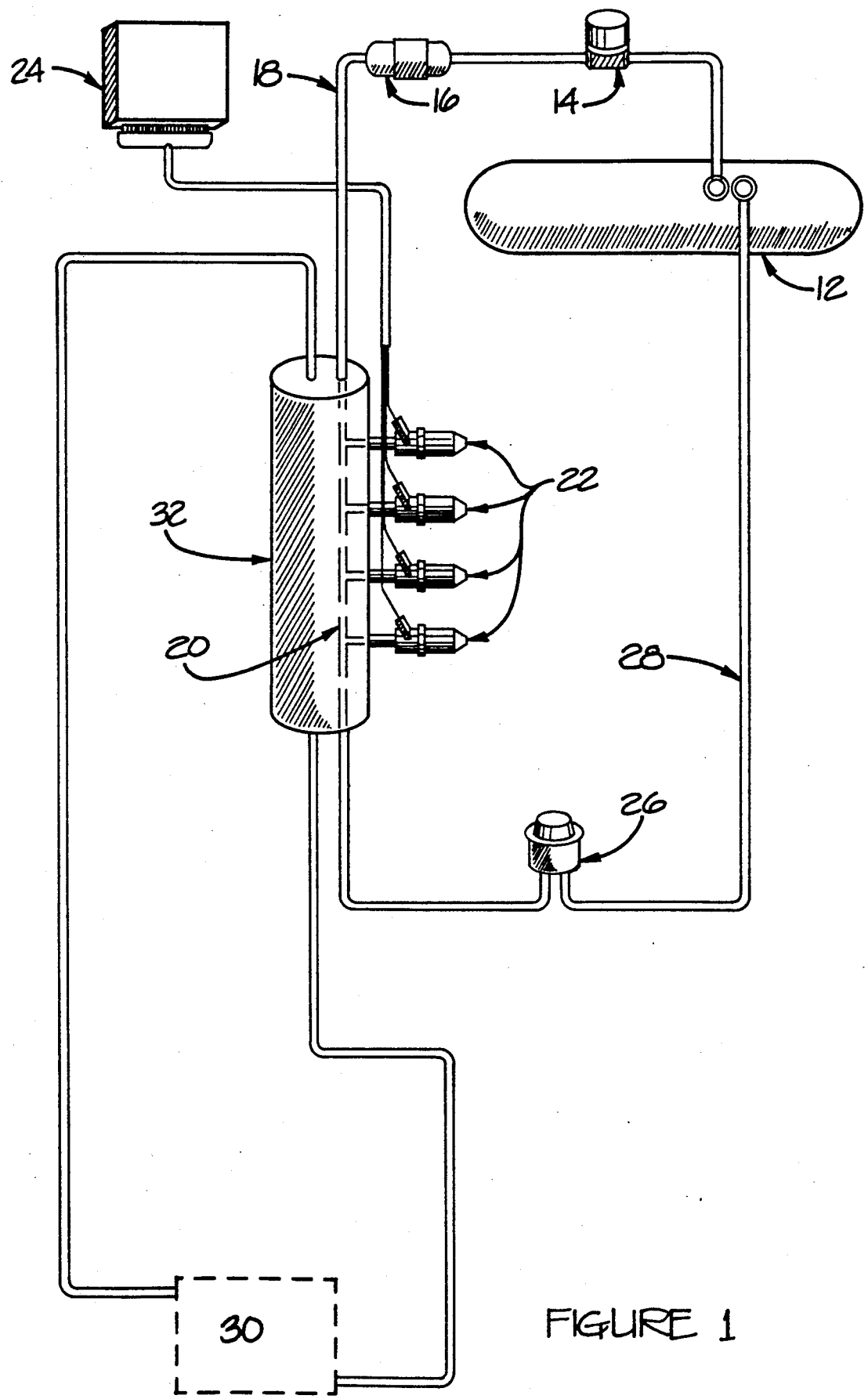
FIG. 1 shows a schematic drawing of the invention in a typical 4-cylinder application.

Turning now to a discussion of the drawings, there is shown in FIG. 1 a schematic drawing of this invention configured for a typical four cylinder engine 10. Butane fuel is stored as a liquid in fuel tank 12 at its equilibrium pressure which ranges from 0 to 45 psi depending on ambient temperature. Liquid fuel passes from tank 12 through an electrically controlled shutoff valve 14 to the high pressure pump 16. The pump is capable of generating a fuel pressure of 65 psi. The fuel travels from the pump through supply conduit 18 to the fuel injection rail 20. Fuel injectors 22 opening response to electronic control unit 24 and deliver a metered quantity of liquid fuel into the intake port regions of the engine. Fuel pressure is controlled in the injection rail by the pressure regulator 26 which allows excess fuel to return to the tank through the return line 28. In order to maintain the Butane as a liquid in the fuel injection rail in spite of heat generated in the combustion chambers, a cooling system 30 is used to remove excess heat from the rail.

Figure 2:
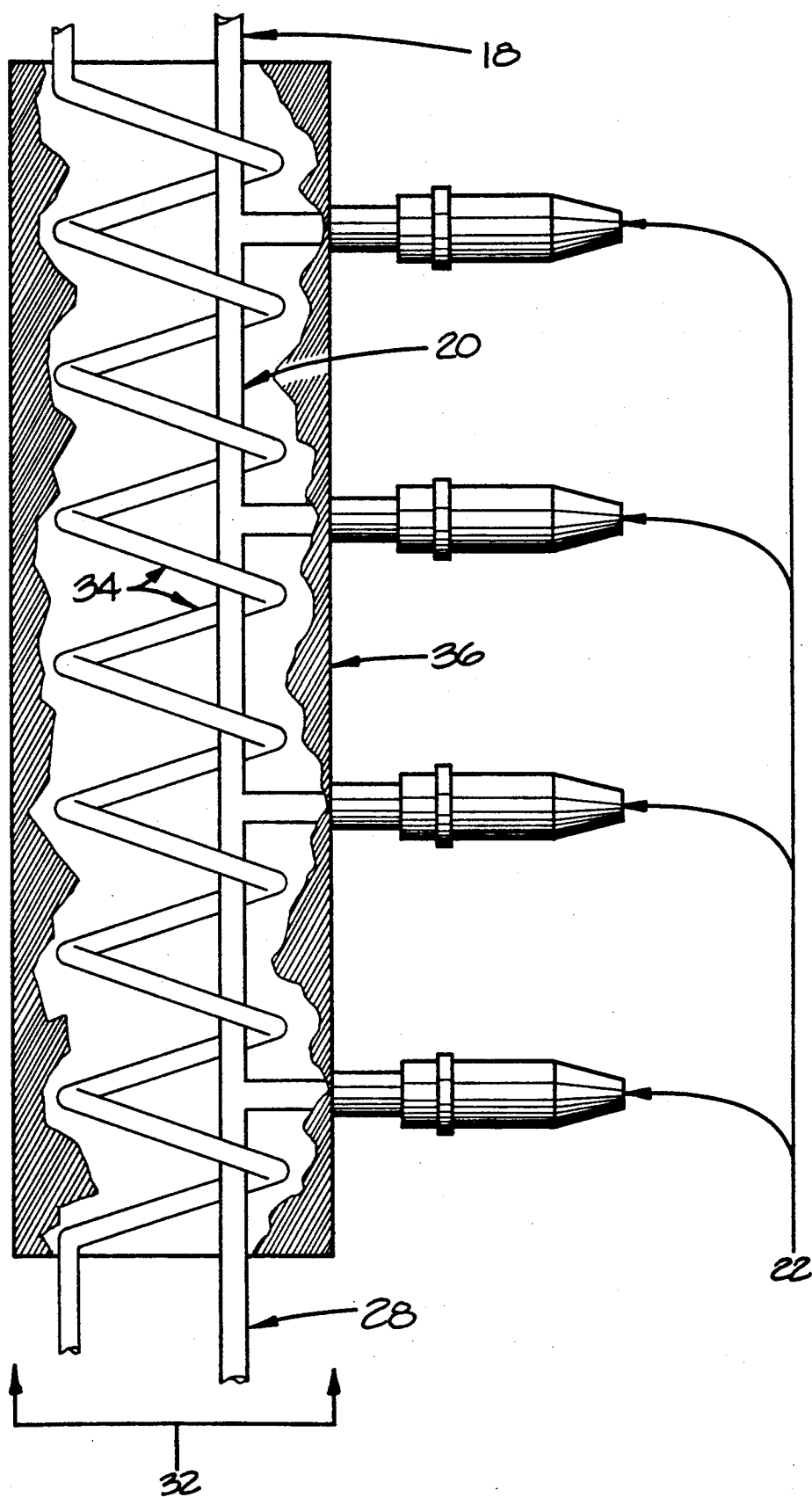
FIG. 2 shows a cross sectional view of the heat exchanger of FIG. 1.
Figure 3:
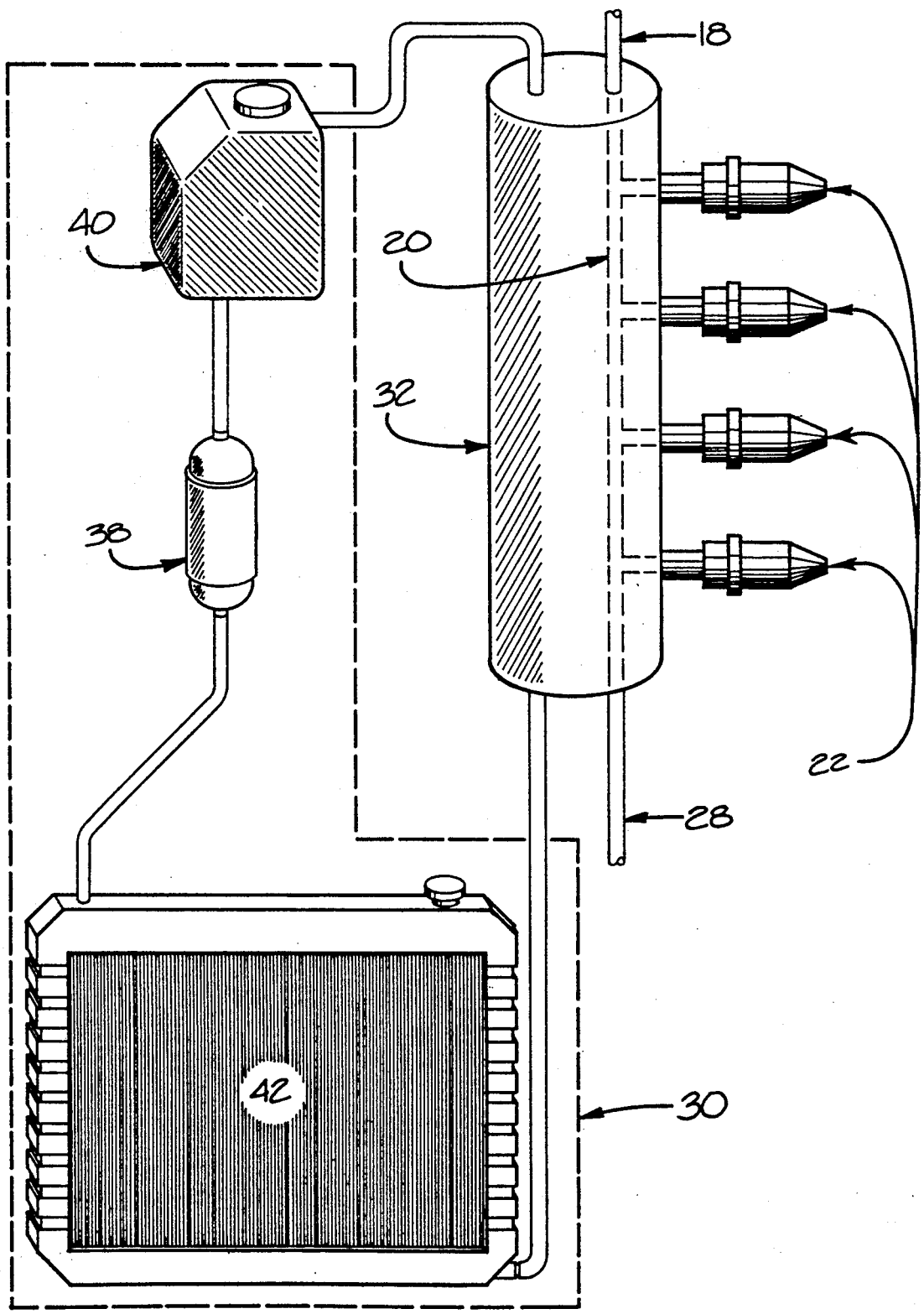
FIG. 3 shows a schematic drawing f a water circulation cooling system. p

In one embodiment, the cooling system comprises a heat exchanger 32 as shown in FIG. 2 which includes numerous coils of tube 34 wrapped around the fuel injection rail 20 and enclosed by an insulated housing 36. As shown in FIG. 3, a small pump 38 moves water from a reservoir 40 through a small radiator 42 located in the front of the vehicle's main radiator (not shown). The chilled water circulates through the heat exchanger 32 and returns to the reservoir 40.

Figure 4:
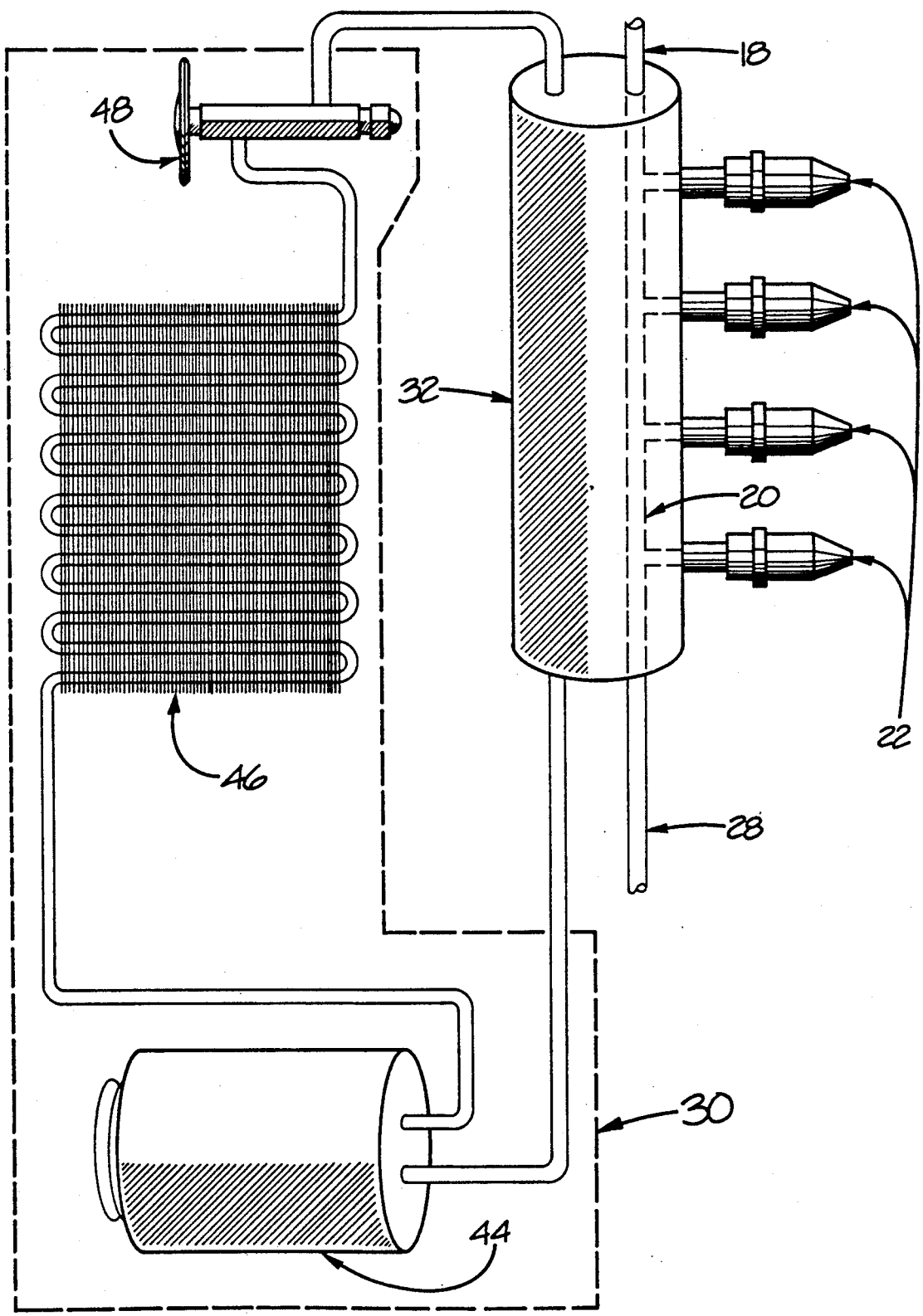
FIG. 4 shows a schematic drawing of a refrigeration cooling system.

In another embodiment shown in FIG. 4, heat exchanger 32 (described above and shown in FIG. 2), is connected to a small refrigeration system including a compressor 44, a condenser 46 and a control valve 48.

Both of the previous embodiments for a cooling system are utilized in the same manner with the fuel system of the engine described in FIG. 1.

"Vapor lock" is a potential problem in which butane fuel in the rail vaporizes when the engine is idle and thereby causes difficulty in starting the engine. In order to prevent vapor lock, it is an additional feature of this invention that the electronic control unit 24 momentarily holds the injectors 22 open to purge any vaporous fuel from the injection rail 20 before the vehicle is started.

The embodiments illustrated by FIGS. 1, 2, 3 and 4 and discussed in the foregoing paragraphs accomplish the objects of the invention which include an engine which can be powered by Butane or other fuels having similar vapor pressure characteristics. Other embodiments may become apparent to the reader studying the drawings and specification. For example, a refrigeration means in which a portion of the fuel is divided off from the fuel stream to serve as a refrigerant is an additional embodiment. It should be understood that these and other various modifications can be made by one of ordinary skill in the art without departing from the spirit thereof. I therefore wish my invention to be defined by the scope of the appended claims as broadly as the prior art will permit and in view of the specification if need be.

We claim:

1. An internal combustion engine powered by a fuel of liquefied petroleum gas which comprises:
   a closed storage container for storing said fuel;
   at least one cylinder head which includes an intake port region communicating with a combustion chamber through an intake valve;
   a fuel injection rail including at least one fuel injector, all injectors operably connected to all intake port regions with one intake region connected to one injector whereby fuel may be injected into said intake regions;
   a conduit connecting said container to said injection rail;
   means for pumping said fuel from said storage container through said conduit to said injection rail and maintaining said fuel at a temperature below a temperature value and pressure above a pressure value required to sustain said fuel in a liquid state whereby said fuel in the liquid state is transferred from said storage container to said rail and is then injected as a liquid into said intake port region where it vaporizes and is admitted into the combustion chambers and is ignited.

2. An engine as in claim 1 wherein said fuel is propane.

3. An engine as in claim 1 wherein said fuel is butane.

4. An engine as in claim 1 wherein said pumping and maintaining means further comprises a regulator operably connected to said conduit to control pressure in said injection rail independent of pressure in said storage container.

5. An engine as in claim 1 wherein said pumping and maintaining means further comprises a means for cooling fuel and operably connected to said rail whereby said fuel is maintained in the liquid state for injection as a spray into said intake port regions.

6. An engine as in claim 5 wherein said cooling means comprises:
   a tube operably coiled around said rail to permit flow of heat from said rail to said tube;
   a reservoir in which a cooling fluid may be stored;
   a radiator operably positioned to enable fluid present in said radiator to be cooled by radiation of heat;
   a pump;
   said pump, radiator, reservoir and coiled tube operably interconnected to circulate cooling fluid from said reservoir, through said tube to said radiator then back to said reservoir thereby removing heat from said rail.

7. An engine as in claim 5 wherein said cooling means comprises:
   a tube operably coiled around said rail to permit flow of heat from said rail to said tube;
   a refrigeration system including a refrigerant and operably connected to said tube to circulate refrigerant between said tube and said refrigeration system thereby removing heat from said rail.

8. An engine as in claim 7 wherein said refrigeration system comprises:
   a compressor;
   a condenser;

a control valve;

said compressor, condenser and control valve operably connected to circulate said refrigerant between said refrigeration system and said tube thereby removing heat from said rail.

9. An engine as in claim 1 which further comprises means to momentarily open said fuel injectors before starting said engine thereby purging fuel vapors from said rail that may have accumulated when said engine is not running and improving starting performance of said engine.

10. A method for using a fuel having a boiling temperature less than temperature of ambient environment to power an engine having at least one cylinder head, each head including an intake port region, communicating with a combustion chamber through an intake valve and a fuel injection system for injecting said fuel into said intake port region which includes the steps:

supplying said fuel to said fuel injection system;

cooling said supplied fuel to maintain said fuel in a liquid state;

injecting said supplied fuel as a sprayed liquid into said intake port region;

maintaining pressure within said intake port region when said sprayed liquid fuel enters said chamber below a value whereby said sprayed liquid will vaporize in said intake port region.

11. A method as in claim 10 which includes the additional step of selecting said fuel to be butane.

* * * * *